Patented Feb. 15, 1927.

1,617,495

UNITED STATES PATENT OFFICE.

SIDNEY A. OGDEN, OF LOS ANGELES, CALIFORNIA.

PROCESS OF COMBINING CELLULOSE AND RUBBER.

No Drawing. Application filed August 1, 1923. Serial No. 655,141.

This invention relates to a process of forming colloidal chemical or molecular combinations of cellulosic substances and rubber.

It has special reference to treatment of substances in which cotton and rubber have already been brought into a state of mechanical admixture during manufacturing processes.

To cite such cases, automobile tires, rubber hose, rubber boots and shoes, may be given as typical examples.

By the present process herein mentioned, new and valuable material can be obtained by combining hydro-cellulose or other similar cellulose derivatives with rubber, or rubber substances and opens up a field of usefulness for what has, hitherto, been a waste product in the reclamation of waste rubber. The process of treatment of rubber scrap containing cotton, for which novelty of method and improvement in procedure is claimed over other practices already known to the art and described by the claimant is as follows:—

The rubber waste is first reduced to small size dimensions by shredding according to present method, and is then submitted to the action of steam preferably under pressure for sufficient length of time to plasticize the rubber.

Sufficient quantity of an alkaline substance is added during the steaming process to activate the cellulose,—the amount necessary being not over 5% on the quantity of cellulose present.

Upon completion of this stage of the process which can be regarded as a semi-devulcanization process, a small per cent of hydrocarbon oil, or tar being generally present, the excess alkali is removed by washing, and the whole, without necessarily being brought to a bone dry condition, is immersed in sulphuric acid of sufficient strength to colloidize or transform the cotton fibres to a hydro-cellulose, in which condition it at once penetrates the rubber colloid and becomes thoroughly amalgamated therewith.

At these early stages of experimentation, it would be impossible to state how far reaching such a union may effect the chemical equilibrium of the newly combined substances, but it is believed, that not only is an intimate dispersion effected, but a chemical or molecular change has actually been brought about by forming hydrocellulose and bringing the cellulosic substance into intimate contact while in colloid state, with rubber substances.

Having carried the second stage of what might be called devulcanization, to completion, it is only required to remove the acid by washing or neutralizing, and allowing the newly combined substances to dry by any desirable method.

When dry, the cellulose rubber material can be milled, or further worked in any desired manner, or vulcanized, etc., in similar manner to crude or reclaimed rubbers.

It will be found that this new cellulose derivative possesses properties of very desirable nature. It greatly increases the tensile strength of the rubber, reduces the melting point, does not retard further vulcanization, and is quite inert toward any subsequent treatment to which rubber compounds are usually submitted.

The object of activating the cellulose by use of alkaline substances, such as caustic soda, and plasticizing the rubber previous to the acid treatment, is the main feature of this improved process, inasmuch as by this method, it is found that but one half the acid necessary to complete the formation of hydro-cellulose is required.

Furthermore, by plasticizing the rubber, and activating, or mercerizing the cotton previously to the acid treatment, a very considerable loss during the process is avoided.

The combination of hydro-cellulose and rubber, during the acid process, produces an extremely gelatinous combination, which, upon any further treatment in the presence of water will tend to disperse to such an extent that a considerable percentage is unavoidably lost when submitted to steam pressure, and during the subsequent working operations.

Therefore, by following the above method, the advantage of plasticizing the rubber first and washing and then completing the devulcanization in the presence of the newly colloidalized cellulose, there leaves no opportunity for loss during the steam treatment, and the subsequent washing, and simultaneously the cellulose may be effectually mercerized or partially hydrated.

It may here be mentioned, that it is not known in the art, where any such method has been devised or practiced relating to the conversion of the waste cotton into a useful product, and, furthermore, making it serve to additional advantage as a devulcanizing medium, other than methods before mentioned by the same applicant.

The preferable method for carrying out the above mentioned process is now given but it may, of course, be modified to suit conditions, without departing from the main principles involved.

First, the rubber scrap containing the cotton fabric is ground to desired dimensions, and submitted to steam pressure in a suitable vessel for sufficient length of time to plasticize the rubber. Preferably, the usual 2 to 5 percent of tar, or other hydro-carbon substance based on the rubber content is added.

A quantity of alkaline substance, such as caustic soda is added in proportion of about 5% more or less to the cellulose content, as an activating or mercerizing medium.

Steam pressure is preferably 125 to 140 lbs. and the time of treatment from 10 to 24 hours according to the state of the vulcanization of the material treated.

After this partial devulcanization has been effected, the contents of the vessel is emptied, and the excess of alkali is removed by washing without necessarily drying to a bone dry condition, the contents are then subjected to acid treatment to colloidalize the cellulose present. The kind and strength of acid, temperature and time of immersion or method may be varied according to desired results and degree of cellulose hydration required.

The best results are obtained with sulphuric acid of 66° Bé. to which approximately equal parts by bulk of water have been added, that is to say, from 45 to 55° Bé. at a temperature of 60° to 70° C., and upon leaving the whole in contact with the acid for 10 to 30 minutes, according to the nature of the material, strength of acid and temperature employed.

The whole is then washed as free as possible of acid, and preferably neutralized before drying, by adding an alkaline substance to the final wash water, such as caustic soda. A more moderate hydrating treatment may be used by various known methods but the above is particularly recommended as it produces a hydrated and partially de-hydrated form of cellulose, insoluble in water.

The cellulose and rubber by this process will be found upon draining the excess of moisture, and drying to be in a state of intimate dispersion, and upon further washing on rolls to be in such a finely divided state of dispersion or solution as to resist all attempts of removal by washing, and the formation of the new cellulose-rubber substance can be considered complete.

The more moderately hydrated or colloidal forms of cellulose referred to above are not recommended where it is desired to obtain tensile strength and retain the rubber like characteristics of the whole, upon completion of the process, but a fairly satisfactory product may be obtained if the cellulose is finally reduced to collodial state by further treatment without the use of acid.

Varying degrees of hydration of cellulose may be effected by varying the quantity of the caustic soda in the above process or the cellulose may be brought to a collodial state by mechanical agitation in presence of water, mastication with other colloids, or by prolonged steaming etc., all of which means and others are known to students of cellulose chemistry, but the use of such methods of forming collodial combination of cellulose by treating with acids, mechanical manipulation as just recited above etc. is not known to have been hitherto practiced in any of the arts, and has not been, hitherto suggested or practiced to form rubber compounds or rubber like substances, prior to the applications above cited, nor have they been taken advantage of in the reclamation of rubber containing cellulose in form of cotton, mechanically combined.

By the above processes, it has been found that by using a caustic soda solution below mercerizing strength, that a certain proportion of the cellulose present is converted, at a very early stage of the process to a soluble form, and it is this soluble cellulose that combining with the tar effects the devulcanizing of the rubber, and thus permits the recovery of a fully plasticized rubber product. A higher per cent of caustic soda retards the breaking down of the fibrous structure of the cotton. This explains why stronger solutions than mercerizing strength are usually employed, in order to destroy the fabric within a given time. The economy of the process is apparent. But 40 pounds of caustic soda and 40 pounds of tar is required for one ton of material treated, in place of 200 pounds of soda required in the usual 3% caustic solution, and only 12 or 13 hours under steam pressure is necessary for most grades of waste rubber, instead of the usual 17 to 30 hours.

What I claim is:—

1. A process of forming a colloidal combination of cellulose and rubber from rubber containing a cellulosic substance in mechanical admixture, by submitting the combined rubber and cellulosic substance to steam in presence of sufficient alkali to activate the cellulose, removing the excess of alkali, and submitting the admixture of cellulose and rubber to the action of acid to form hydrocellulose, washing free of acid and drying the resulting substance in state of combination.

2. A process of forming a colloidal combination of cellulose and rubber from rubber containing a cellulosic substance in mechanical admixture, by submitting the combined rubber and cellulosic substance to steam in presence of sufficient alkali to activate the cellulose, removing the excess of alkali, and submitting the admixture of cellulose and rubber to the action of acid to form colloidal cellulose derivatives, washing free of acid and drying the resulting substance in state of combination.

3. A process of forming a colloidal combination of cellulose and rubber from rubber containing a cellulosic substance in mechanical admixture, by submitting the combined rubber and cellulosic substance to steam in presence of sufficient alkali to activate the cellulose, removing the excess of alkali, and submitting the admixture of cellulose and rubber to the action of acid to form hydro-cellulose, washing free of acid and drying the resulting substance in state of combination.

4. A process of forming a colloidal combination of cellulose and rubber from rubber containing a cellulosic substance in mechanical admixture, by submitting the combined rubber and cellulosic substance to steam in presence of sufficient alkali to activate the cellulose, removing the excess of alkali, and submitting the admixture of cellulose and rubber to the action of acid to form a combination of hydro-cellulose and rubber, washing free of acid and drying the resulting substance in state of combination.

5. A process of forming a colloidal combination of cellulose and rubber from rubber containing a cellulosic substance in mechanical admixture, by submitting the combined rubber and cellulosic substance to steam in presence of sufficient alkali to activate the cellulose, removing the excess of alkali, and submitting the admixture of cellulose and rubber to the action of acid to form a combination of colloidal cellulose derivatives and rubber, washing free of acid and drying the resulting substance in state of combination.

6. A process of forming a colloidal combination of cellulose and rubber from rubber containing a cellulosic substance in mechanical admixture, by submitting the combined rubber and cellulosic substance to steam in presence of sufficient alkali to activate the cellulose, removing the excess of alkali, and submitting the admixture of cellulose and rubber to the action of acid to form a combination of hydro-cellulose and rubber, washing free of acid and drying the resulting substance in state of combination.

7. A process for forming a combination of cellulose and rubber from rubber containing a cellulosic substance in mechanical combination, by plasticizing the rubber in presence of an alkaline substance and subsequently treating the whole to a cellulose hydrating process, and drying.

8. A process for forming a combination of cellulose and rubber from rubber containing a cellulosic substance in mechanical combination, by plasticizing the rubber in presence of an alkaline substance and subsequently treating the whole to a cellulose hydrating and de-hydrating process, and drying.

9. A process for forming a combination of cellulose and rubber from rubber containing a cellulosic substance in mechanical combination, by plasticizing the rubber in presence of steam, and an alkaline substance, removing the alkali, and subjecting the whole while in state of combination to mechanical treatment to colloidalize the cellulose present and form a uniform aggregate, and drying.

10. A process for forming a combination of cellulose and rubber from a mixture containing rubber and a cellulose substance in mechanical combination, by plasticizing the rubber in the presence of steam, an alkaline substance and a hydro-carbon tar, removing the soluble impurities, and subjecting the whole while in state of combination to cellulose hydrating processes, to produce a uniform colloidal product, and drying.

In testimony whereof I affix my signature.

SIDNEY A. OGDEN.